W. C. EVANS & E. H. TAYLOR.
S. M. EVANS, ADMINISTRATRIX, AND C. M. DAVIS, ADMINISTRATRIX DE BONIS NON OF W. C. EVANS, DEC'D.
HEEL BREASTING MECHANISM.
APPLICATION FILED NOV. 2, 1905.
923,782.
Patented June 1, 1909.
5 SHEETS—SHEET 4.
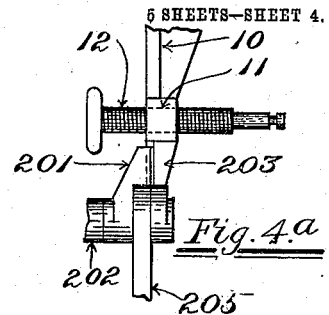
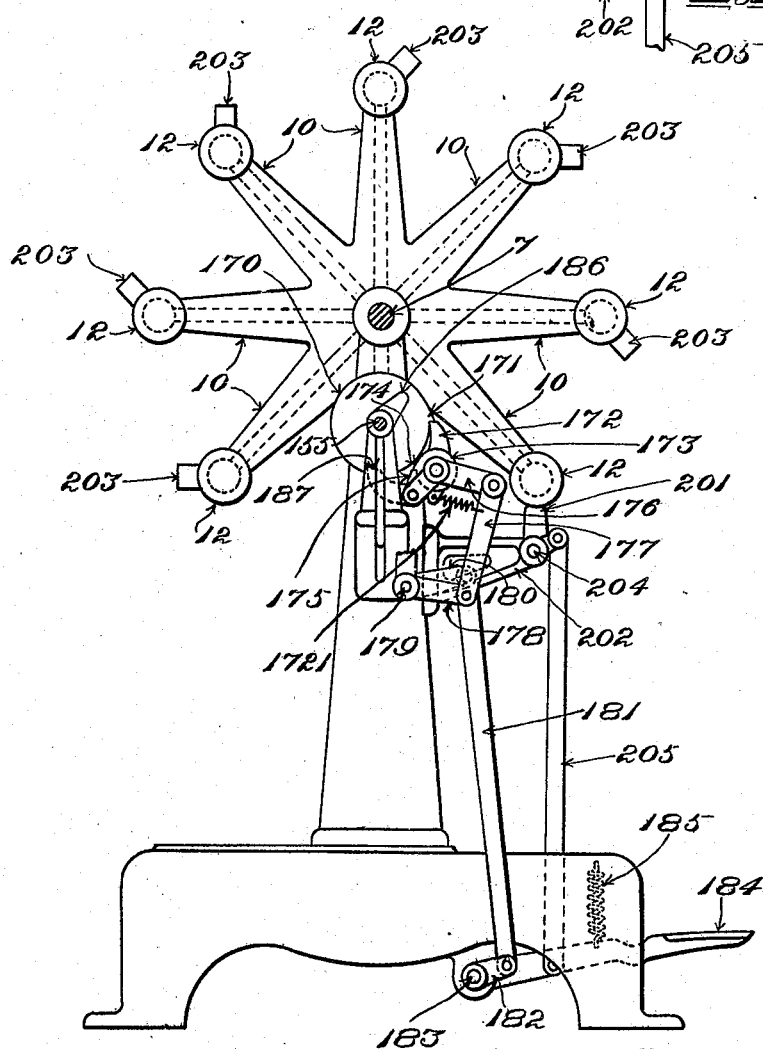
Witnesses:
Oscar F. Hill
Edith J. Anderson
Inventors:
Sarah M. Evans, Admx,
Eugene H. Taylor
By Chas. F. Randall
Attorney.

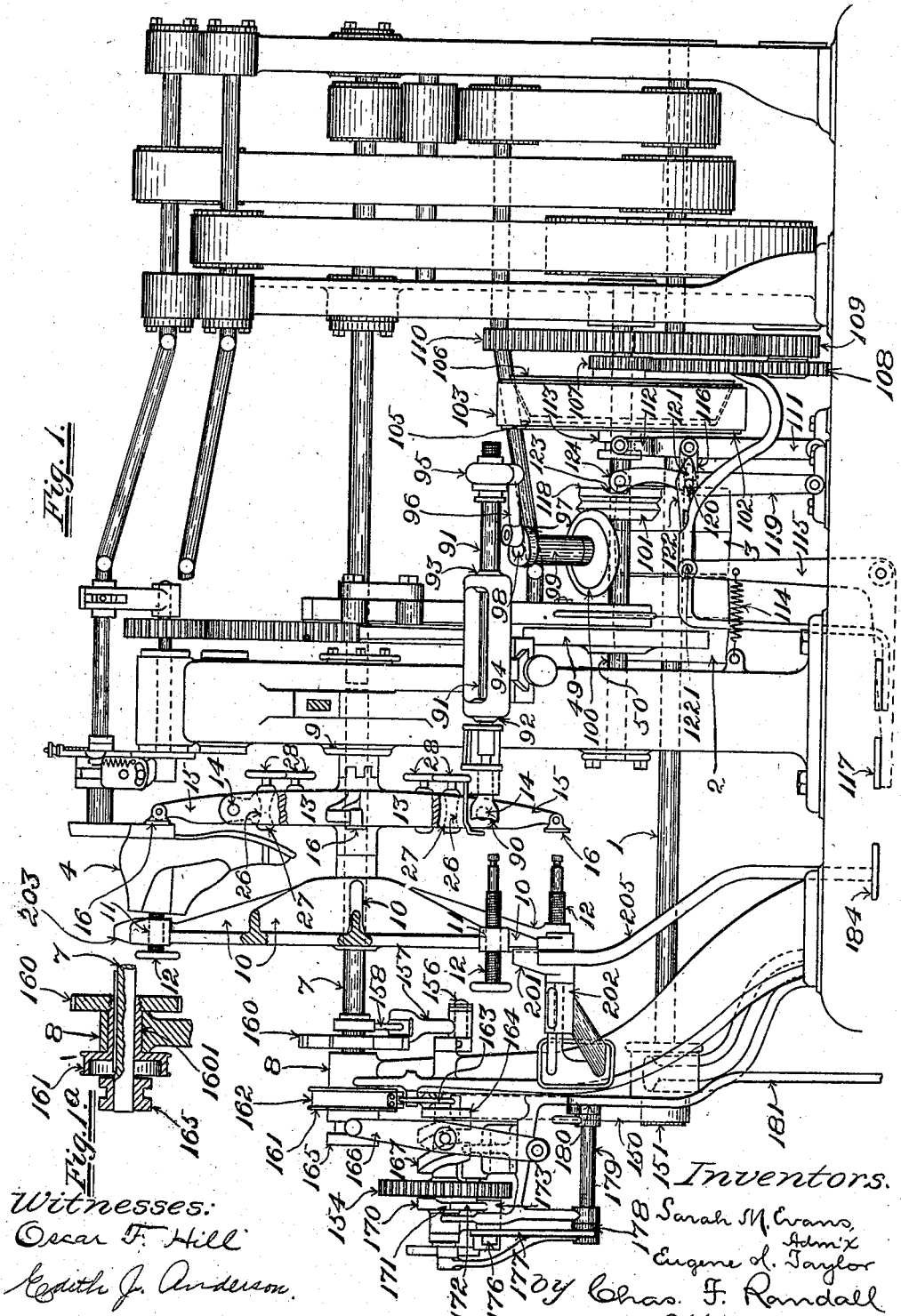

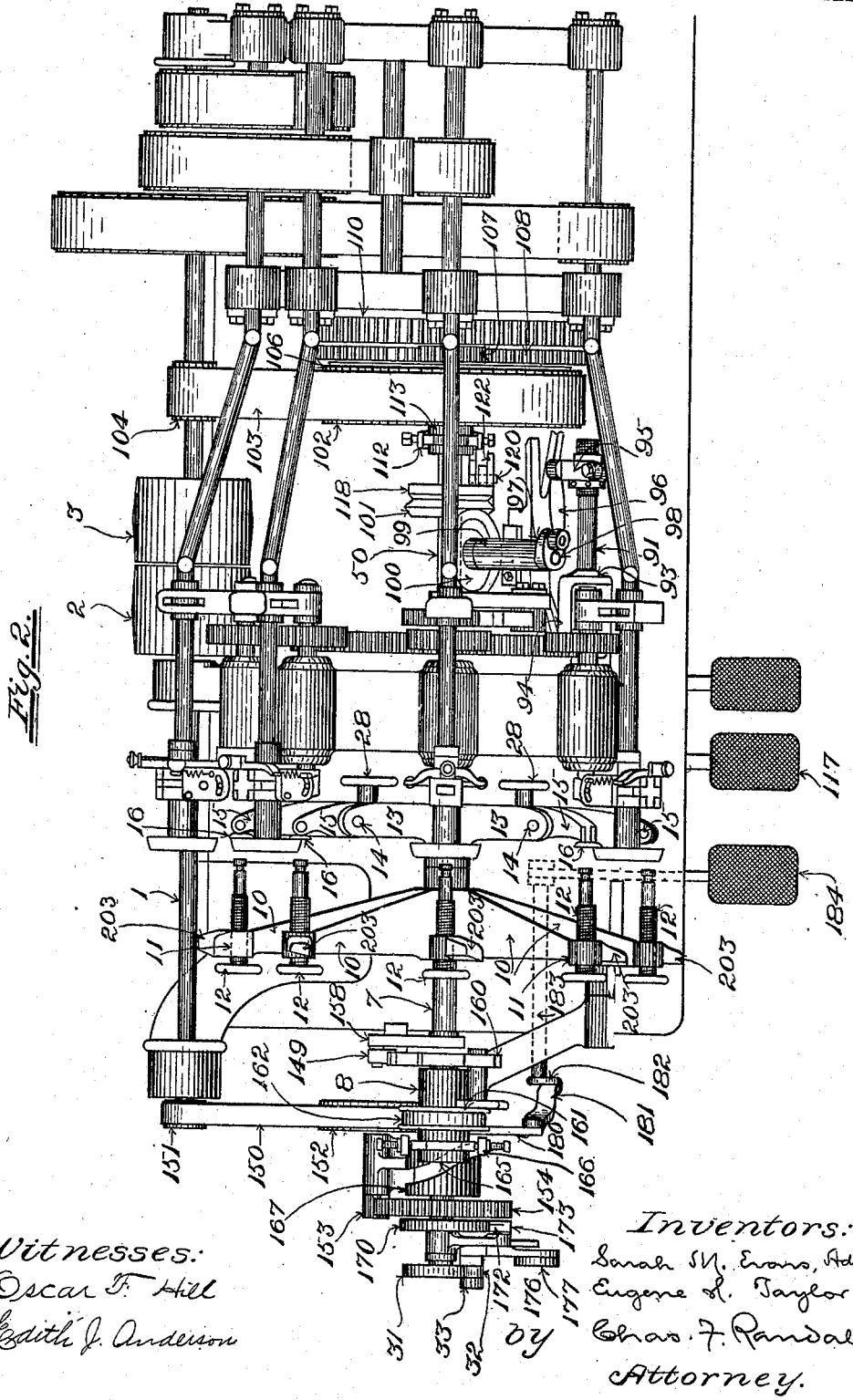

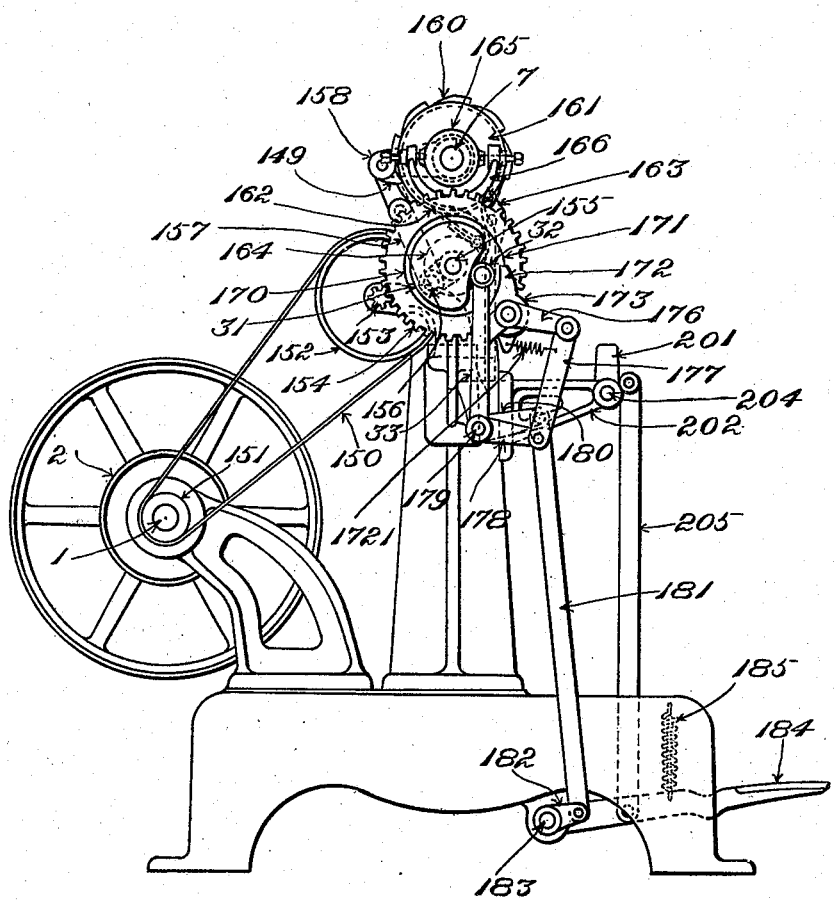

W. C. EVANS & E. H. TAYLOR.
S. M. EVANS, ADMINISTRATRIX, AND C. M. DAVIS, ADMINISTRATRIX DE BONIS NON OF W. C. EVANS, DEC'D.
HEEL BREASTING MECHANISM.
APPLICATION FILED NOV. 2, 1905.
923,782.
Patented June 1, 1909.
5 SHEETS—SHEET 5.
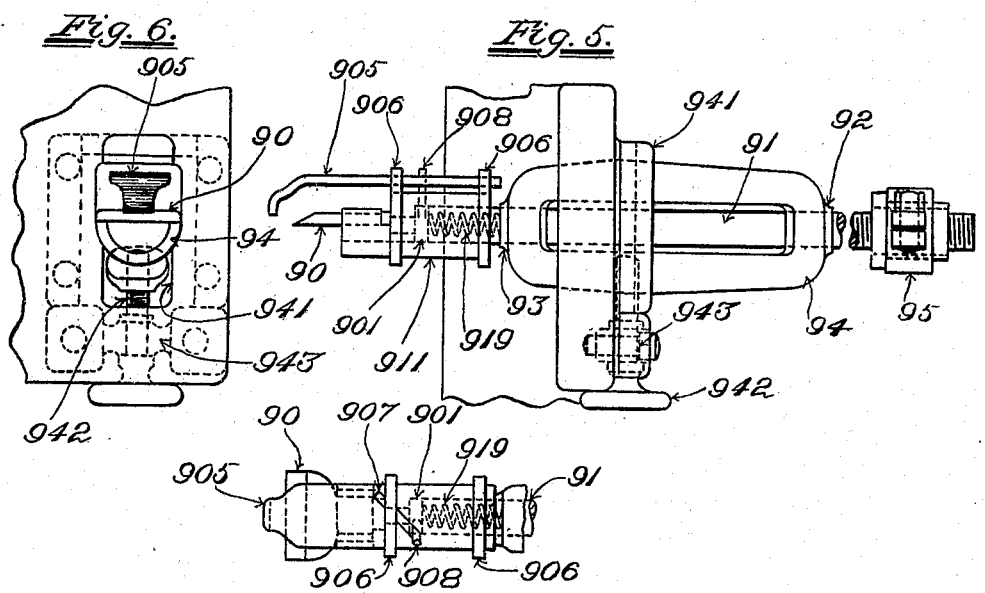
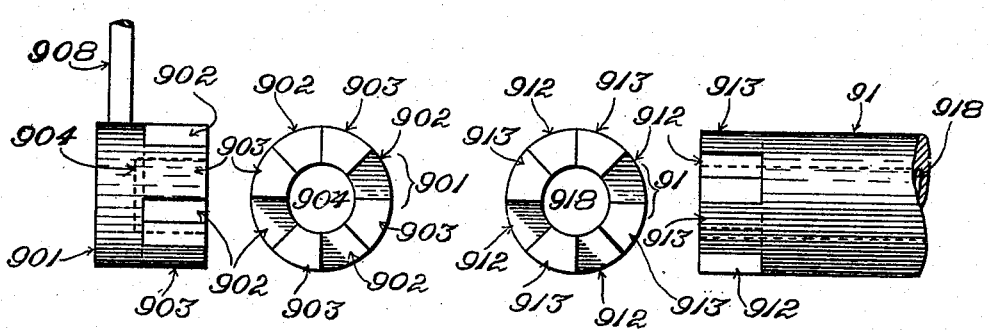
Witnesses:
Oscar F. Hill
Edith J. Anderson.
Inventors:
Sarah M. Evans, Admx.
Eugene H. Taylor
By Chas. F. Randall
Attorney.

UNITED STATES PATENT OFFICE.

SARAH M. EVANS, OF EXETER, NEW HAMPSHIRE, ADMINISTRATRIX OF WARREN C. EVANS, DECEASED, AND EUGENE H. TAYLOR, OF HYDE PARK, MASSACHUSETTS; CLARA M. DAVIS, ADMINISTRATRIX DE BONIS NON OF SAID WARREN C. EVANS, DECEASED, AND EUGENE H. TAYLOR ASSIGNORS TO THE AUTOMATIC HEEL TRIMMING AND BURNISHING MACHINE COMPANY, OF EXETER, NEW HAMPSHIRE, A CORPORATION OF MAINE.

HEEL-BREASTING MECHANISM.

No. 923,782.      Specification of Letters Patent.      Patented June 1, 1909.

Original application filed August 9, 1902, Serial No. 119,065. Divided and this application filed November 2, 1905. Serial No. 285,506.

*To all whom it may concern:*

Be it known that WARREN C. EVANS, deceased, a citizen of the United States, formerly residing at Exeter, in the county of Rockingham and State of New Hampshire, and EUGENE H. TAYLOR, also a citizen of the United States, residing at Hyde Park, in the county of Norfolk and State of Massachusetts, did invent certain new and useful Improvements in Heel-Breasting Mechanism, of which the following is a specification, reference being had therein to the accompanying drawings.

The invention is a division of that forming the subject of the original application for U. S. Letters Patent for machine for finishing the heels of boots and shoes which was filed by Warren C. Evans and Eugene H. Taylor on August 9, 1902, Serial No. 119,065. The machine of the original or parent application just mentioned is provided with a series of heel-finishing tools, and with a work-carrier to which a boot or shoe requiring to have the heel thereof finished is applied, the said boot or shoe being shifted by movement of the said work-carrier into working relations with the finishing tools in succession, so that while it is in the machine its heel is subjected automatically to the required variety of finishing operations. The work-carrier is furnished with a number of jacks which are arranged to receive and support a number of boots or shoes at one time while the heels thereof are being acted upon by the finishing tools. It has combined therewith power-actuated shifting devices under the control of the operator whereby, at the will of the latter, it is shifted step by step to present the heel of each boot or shoe in turn to the action of the respective finishing tools, successively.

This division of the invention of the original application aforesaid comprises, essentially, means for backing-up the work-carrier against the pressure and strain which are incident to the action of a breasting-cutter in breasting the heel of a boot or shoe. Also, an improved mechanism for actuating a breasting-cutter, constructed and arranged to vary the stroke of the said cutter to suit the thickness of the heel by automatically terminating the said stroke when the cutter has passed through the heel.

The invention is illustrated by the accompanying drawings, in which latter,—

Figure 1 shows in front elevation a machine in which the invention is embodied, certain portions being broken away to simplify the illustration. Fig. 1$^a$ is a sectional detail of the supporting and actuating devices for the work-carrier. Fig. 2 shows the said machine in plan. Fig. 3 is an end elevation looking from the left in Figs. 1 and 2. Fig. 4 is a view looking from the left in Figs. 1 and 2, showing chiefly a portion of the work-carrier, the clutch-connections, and the controlling means for the latter. Fig. 4$^a$ is a detail view illustrating portions of the backstop arrangement on an enlarged scale in front elevation. Fig. 5 shows separately and on an enlarged scale the breasting-cutter, the means of supporting and adjusting the same, and a portion of its actuating connections. Fig. 6 shows the parts which are represented in Fig. 5, in elevation viewed from the left in Fig. 5. Fig. 7 shows the breasting-cutter and certain of the adjacent parts of Figs. 5 and 6, viewed from the top in the said figures. Figs. 8, 9, 10 and 11 are views on a still further enlarged scale, showing details of the actuating means for the breasting-cutter.

Having reference to the drawings,—in Figs. 1, 2 and 3, 1 is the driving-shaft of the machine. 2 and 3 are fast and loose band-pulleys, respectively, to which in practice a driving-band for the transmission of driving-power to the machine is applied.

The work-carrier is mounted upon a shaft 7, the said shaft having suitable bearings at 8 and 9 in connection with the machine-frame. The said shaft is supported in a manner adapting it to rotate and also to slide longitudinally to a certain extent. The work-carrier is provided with a plurality of work-supports or jacks which are arranged in a circular series. The finishing tools are arranged in a corresponding series upon a suitable portion of the fixed frame of the machine, namely, the intermediate upright portion of the said frame. The work-carrier is shown constructed with two radiating series of arms. One arm of each of the said series coöperates with the corresponding arm of the other series in the support of a boot or shoe, and hence such a pair of arms with their appurtenances constitute a work-support or jack. 10, 10, are the arms of one series, each of such arms having a screw-threaded hole tapped through its outer extremity 11, the said hole receiving a hand-screw 12, which is intended to carry at its inner end a form or last supporting a boot or shoe 4. In Fig. 1 for the sake of clearness only one shoe 4 is shown. 13, 13, are the arms of the other series of arms, each thereof having pivoted thereto at 14, a clamping-arm 15, to the outer extremity of which in turn a plate or block 16 is swiveled or hinged, the said plate or block being intended to bear against the exposed face of the heel of a boot or shoe that is mounted upon the last or form which is carried by the hand-screw 12 of the corresponding arm 10. Each pivoted clamping-arm 15 is furnished with a worm-gear segment 26 that is engaged by a worm 27, the said worm being mounted to turn in a bearing in the corresponding fixed arm, and being provided with a hand-wheel 28 for convenience of manipulation. By means of the worms and their hand-wheels the pivoted clamping-arms 15, 15, may be operated to cause their swiveled plates or blocks 16, 16, to bear against the faces of the top-lifts of the heels which are opposite the same, or to withdraw said swiveled plates or blocks from contact with the said top-lifts. The specific construction of the work-carrier as thus far described is made the subject of claims in the application for U. S. Letters Patent for jack for boot and shoe machinery forming a division of the original or parent application aforesaid and filed March 29, 1905, Serial No. 252,617.

We have shown herein the power devices for automatically operating the work-carrier at the will of the operator which are claimed in the original or parent application aforesaid. The means for rotating the work-carrier step by step for the purpose of presenting a boot or shoe which is mounted on one of the work-supports or jacks thereof to each of the tools in succession comprises a driving-band 150 that extends from a pulley 151 on the driving-shaft 1 at the side of the machine to and around a somewhat larger pulley 152, on the shaft of which latter is a spur-pinion 153 meshing with a spur-gear 154 that ordinarily turns loosely upon the operating shaft 155 for the work-carrier. The said operating-shaft is operatively connected with the shaft 7 of the work-carrier by means of a crank 156 on the said operating shaft, a connecting-rod 157 having one end thereof joined to the said crank, a swinging-arm or pawl-carrier 158 that is loosely mounted concentrically with the shaft 7 of the work-carrier and has the other end of the said connecting-rod joined thereto, a pawl 149 that is connected with the said arm or pawl-carrier, and a ratchet-wheel 160 that is operatively connected with the shaft 7 of the work-carrier to turn in unison therewith. Overrunning of the work-carrier after each advance thereof is prevented by means of a brake-pulley 161 that is operatively connected with the shaft 7 of the work-carrier to rotate in unison therewith, a brake-band 162 in contact with the periphery of the said brake-pulley, an operating lever 163 in connection with the said brake-band, and an actuating-cam 164 for the said lever, the said cam being fast upon the work-carrier operating shaft 155 and set to apply the brake at the end of each revolution of the said operating shaft.

The movement of the work-carrier in the direction of the length of its shaft 7 to withdraw it, prior to each advance, a sufficient distance relative to the tools to enable the boots or shoes and all portions of the work-supports or jacks carrying the same to entirely clear the tools in advancing, and after the completion of the advance to restore it to its normal position with relation to the tools, is permitted by fitting the inner end of the work-carrier shaft 7 within a simple bearing at 9 in the intermediate upright portion of the machine-framing, and fitting its opposite or outer end within a sleeve 1601, held in the bearing at 8 with which the left-hand upright of the machine-frame is provided, and adapted to turn within the said bearing. The sleeve 1601 is splined to the shaft 7 to cause the two to rotate in unison, while permitting the shaft to be moved longitudinally within the sleeve, and to the opposite ends of the sleeve are connected the ratchet-wheel 160 and the brake-pulley 161, respectively. The means of occasioning the withdrawal and return of the work-carrier comprises the grooved collar 165 which is fixed upon shaft 7 and engaged by the shifter-fork 166, and the grooved cam 167 on the work-carrier operating shaft 155, the said cam being in operative engagement with the said shifter-fork. The devices by means of which the shaft 155 is operated at the will of the operator to operate the work-carrier comprise the disk 170 that is fast upon the said shaft and having the shoulder 171 at the periphery thereof to be engaged in usual manner by the controlling dog or pawl 172 for the purpose of holding the clutch open. 1721 is the spring in connection with the said dog or pawl tending to throw the engaging end of the latter into the path of rotation of the said shoulder.

174 is the shoulder on the hub 173 of the dog or pawl, for engagement by the dog 175 pivoted on one arm of the lever 176, movement of said lever operating through the engagement of the said dog with the said shoulder to throw dog or pawl 172 out of engagement with shoulder 171 of clutch-disk 170. 177 is the rod by which the said lever 176 is connected with one arm 178 of a rock-shaft 179 having a second arm 180 that is connected by a rod 181 with an arm 182 on a treadle-rock-shaft 183, the latter having applied thereto a treadle 184 that is acted upon by a spring 185. The said spring tends to move the parts in a direction to permit the engaging end of the disengaging dog or pawl 172 to stand in the path of rotation of the shoulder 171 on the disk 170 of the clutch, but pressure exerted by the operator upon the said treadle withdraws the disengaging dog or pawl from the said shoulder and permits the clutch to close, thereby connecting the gear and the work-carrier operating shaft together.

At 186 is the tripping cam or tappet which is mounted upon the operating shaft 155 for the purpose of automatically disconnecting the clutch at the end of a single revolution of the work-carrier operating shaft, in case pressure is maintained upon the treadle 184 by the operator, the said tripping cam or tappet 186, at the required instant in the rotation of the said operating shaft, striking the tail 187 of the tripping dog or pawl 175, and disengaging the latter from the disengaging dog or pawl 172 so as to permit the said dog or pawl 172 to be swung by its spring into the path of rotation of the shoulder 171 of the disk 170 pertaining to the clutch. The movement of the treadle 184 and its connections when the same are operated to raise the disengaging dog or pawl, that is to say, to withdraw it from the path of rotation of the shoulder on the disk 170 pertaining to the clutch, causes the tripping-tail 187 to be raised into the path of rotation of the tripping-cam 186.

The breasting-cutter 90 is attached to a slide or plunger 91 moving in a horizontal line and supported by bearings 92, 93, in a suitable stand 94 that is attached to the machine-framing. A collar 95 fitted to the said slide or plunger is connected by means of a rod 96 to a crank 97 at one end of a short inclined shaft 98 mounted in a suitable bearing 99 carried by the machine-framing, the other end of the said inclined shaft having affixed thereto a bevel-gear 100 meshing with a like gear 101 on the shaft 50. Besides operating the breasting-cutter, the shaft 50 serves, as shown and described in the original or parent application aforesaid, for the transmission of power to the devices for traversing certain of the finishing tools around the heels which are operated upon in the machine. The driving bevel-gear 101 and shaft 50 are rotated by means of a driving train embracing start-and-stop devices under the control of the operator by means of which the said driving train is made operative at the will of the operator to start the said bevel-gear and rotate the same until the required operations of the tools upon the heels in position adjacent the same have been effectuated, after which the said driving train automatically is disconnected to discontinue the working of the shaft 50 and the parts which are actuated therefrom, for the purpose of enabling the operator to remove from the work-carrier a shoe which has had the heel thereof subjected to the required number of finishing operations, and apply a fresh shoe to be operated upon, and, also, for the purpose of affording an opportunity for an advancing movement of the work-carrier. The said start-and-stop devices comprise the loose band-pulley, 102, which is driven by a band 103 from a band-pulley, 104, on the driving shaft 1 of the machine, the said band-pulley being formed or provided with one member of a friction-clutch as shown at 105 in dotted lines in Fig. 1. The other member 106 of said friction-clutch has combined therewith a spur-pinion 107 meshing with a spur-gear 108, the said spur-gear having fast therewith a spur-pinion 109 meshing with a spur-gear 110 fast on the shaft 50 carrying the said cam 49 and driving bevel-gear 101. The two clutch-members 102 and 106, and the spur-pinion 107, are mounted loosely upon the said shaft. The shipper for the said friction-clutch is constituted by a lever 111 having a fork 112 in engagement with the grooved hub 113 of the loose band-pulley, the said shipper being acted upon by a spring 114, Fig. 1, which is connected with the machine-framing and also with a lever 115 that is united to the shipper by a connecting-rod 116. For the purpose of enabling the operator to move the shipper to close the clutch when it is desired to start the movement of the tool-carriers and breasting-cutter, a treadle 117 is provided, the latter being in operative connection with the said lever 115. For the purpose of holding the clutch closed while the required movements are being communicated to the tool-carriers and breasting-cutter, a controlling cam 118 is made fast on the shaft 50, the face of which cam acts, after the said shaft has begun to rotate, against a pin or roll 124 carried by an arm 119 which is in operative connection with the shipper 111. The said connection is established in the present instance by means of a pin 120 projecting from the arm 119 into a slot 121 (shown in dotted lines in Fig. 1) that is formed in connecting-rod 116. Normally, the said pin is held locked at one end of the said slot, as by means of a movable hooked latch 122 which is pivoted to the lever 115 at 122¹, and thus the arm 119 and connecting-rod 116 are locked together so that they are compelled to move in unison. During the rotation of the controlling-cam 118, the face thereof acts against the stud or roll 124 of the arm 119 to hold the shipper in position to keep the clutch in closed and operative position. At the end of the required rotation of the shaft 50 the driving-power therefor is thrown off automatically, this action being governed by the said controlling-cam, which latter is formed in one portion of the circuit thereof with a notch or depression 123. When, in the rotation of the said controlling-cam, this notch is presented to the stud or roller 124 carried by the arm, the spring 114 is permitted to move the parts with which it is connected in a direction to open the friction-clutch and throw off the power. Until the said notch or depression in the controlling-cam arrives in position to receive the said stud or roller, the face of the said cam acts to hold the shipping-device in position to maintain the clutch in a closed and operative condition.

When the breasting-cutter 90 is advanced and acts upon the heel which is supported in line therewith in readiness for the breasting operation, considerable strain is imposed upon the pair of arms of the work-carrier which supports the shoe to which such heel pertains. For the purpose of backing-up or supporting the said arms against springing under the said strain, we provide a backing-up device 201 which is mounted upon a stand 202 on the machine-framing adjacent the work-carrier. In each position of rest of the work-carrier, the arm 10 of the work-support or jack which is in line with the breasting-cutter occupies a position alongside the backing-up device 201, and the latter coöperates with such arm so that when the breasting-cutter acts the tendency of the resulting pressure to spring the work-supporting arm is withstood by the backing-up device. In the present instance each arm 10 of the work-carrier is furnished with a projecting portion 203 to coöperate with the backing-up device 201. The backing-up device is movable into and out of working position, and is connected with the treadle 184, so that when the said treadle is depressed for the purpose of closing the actuating clutch of the work-carrier, in order to occasion a shift of the work-carrier, the backing-up device 201 is moved away from its working position entirely clear of projection 203 and other portions of the work-carrier to thereby leave the latter free from obstruction to its movements, both in the direction of the length of the shaft 7, and rotary. The backing-up device 201 is herein constituted by an arm which is journaled at 204 upon the stand 202, and connected by the connecting-rod 205 with the treadle 184. The action of the spring 185 in raising the treadle 184 also restores the backing-up device 201 to its normal position shown in Figs. 7 and 8.

The back of the projection 203 of each arm 10 of the work-carrier is slightly beveled or inclined, as indicated in Figs. 2 and 4ᵃ, and the face of the backing-up device 201 is correspondingly, but reversely, beveled to fit against the said back. This beveling of the co-acting portions or surfaces of the projection 203 and backing-up device 201 facilitates the movement of the backing-up device in a transverse direction with relation to the said projection into position to coöperate with the latter, and obviate liability of the backing-up device to catch against the outer edge of the projection. It also enables the acting face of the backing-up device to make firm contact with the back of the projection.

After the backing-up device has been retracted through its connections with the treadle 184, when such treadle is moved by the operator to clutch the driving connections with the work-carrier for the purpose of communicating an advancing movement to the work-carrier, the backing-up device is retained automatically in its retracted position through the instrumentality of a cam 31 fast upon the shaft 155, the periphery of which cam acts against a roll 32 carried by an arm 33 fast upon the shaft 179. The said cam is formed with a depression which is presented to the roll in the position which is occupied by the shaft 155 when the latter is standing at rest. During the rotation of the shaft 155 the periphery of the cam acts against the roll 32 so as to keep the arm 33, the shaft 179, the treadle, and the backing-up device in the positions which were given thereto by the operator in pressing upon the treadle for the purpose of clutching the actuating connections to the work-carrier. As the shaft 155 completes its revolution, the said depression of the cam is presented to the roll 32 again, thereby permitting the arm 33, shaft 179, treadle 184, and backing-up device to be moved reversely into their normal positions through the action of the spring 185 which is in connection with the treadle 184.

Having reference now to the details of the breasting-cutter,—for the purpose of supporting and adjusting the said cutter, the stand 94 containing the bearings 92, 93, for the slide or plunger 91 is fitted within a guide-way 94¹ on the machine-framing, in which guide-way the said stand is mounted to slide transversely with relation to its length. An adjusting-screw 94², which is mounted in a suitable bearing on the machine-framing at 943, engages by its screw-threaded portion with the stand 94. By means of the said adjusting-screw, the stand 94 may be adjusted transversely so as to place the breasting-cutter 90 in position suitable for the desired length of heel. For the purpose of preventing the breasting-cutter from being driven too far into the work as it is advanced to trim the breast of a heel, the said cutter is mounted in the carrier 911 at the outer end of the slide or plunger 91 with capacity for independent movement longitudinally of the said slide or plunger. At the inner end of the shank of the breasting-cutter a block 901 is mounted in the carrier 911 and is acted against by a spring 919 which tends to force the same outwardly in the direction of the length of the slide or plunger, causing the said block to bear against the end of the shank of the breasting-cutter, and operating to hold the latter projected beyond the end of the carrier 911. The side of the said block opposite the cutter is formed with a series of slots 902, 902, extending lengthwise of the block, between which are projections 903, 903. The said block is in line with the proximate end of the slide or plunger 91, which latter is formed with a corresponding series of longitudinal slots 912, 912, and intermediate projections 913, 913. The spring 919 is contained within chambers 918 and 904, respectively, which are bored out in the proximate ends of the slide or plunger 91 and block 901, respectively, and its opposite ends are connected with the slide or plunger and block, respectively, so as to enable the spring to act torsionally to partially turn or rotate the block 901 relative to the slide or plunger 91. The projections 903, 903, of the block 901, stand normally in line with the projections 913, 913, of the slide or plunger, and consequently when the slide or plunger is advanced it carries block 901 and cutter 90 with it, driving the said cutter into the material of the heel which is in front of the same. At 905 is a gage that is adapted to make contact with the shank of the shoe upon which the breasting-cutter is acting. The body of the said gage is fitted to guides 906, 906, on the carrier 911, through which guides it is adapted to slide in the direction of the length of the slide or plunger. The said body of the gage is formed with a diagonal slot 907 receiving a pin 908 which projects radially from the block 901. The torsional force of the spring 919, in acting to turn the block 901 into its normal position, causes the pin 908 to bear against one of the inclined sides of the diagonal slot 907, and the pressure serves to advance the gage 905 the proper distance beyond the working end of the cutter 90, this distance being determined by the position of the inner end of the slot 07. When, during the advance of the slide or plunger 91, the gage 905 encounters the shank of the shoe, the said gage is arrested and held stationary while the other parts continue to move. In the course of the said movement, the travel of the pin 908 forward within the diagonal slot 907 causes the side of said slot against which the pin takes bearing to push the pin sidewise, rotating the block 901 until its slots 902, 902, are presented to the projections 913, 913, of the slide or plunger 91, whereupon the pressure of the slide or plunger 91 will no longer be transmitted to the block 901, and the advancing movement of the cutter will cease.

What is claimed as the invention of the said WARREN C. EVANS and EUGENE H. TAYLOR is as follows:—

1. In a machine for finishing boots or shoes, in combination, a reciprocatory tool, a movable work-carrier having a series of work-supports to receive a plurality of boots or shoes, means to advance said work-carrier step-by-step to present said boots or shoes successively in position to be acted upon by the said tool, and a backing-up device adjacent the tool and by which the work-support which is in line with the said tool is supported against the thrust of the tool.

2. In a machine for finishing boots or shoes, in combination, a reciprocatory tool, a movable work-carrier having a series of work-supports to receive a plurality of boots or shoes, means to advance said work-carrier step-by-step to present said boots or shoes successively in position to be acted upon by the said tool, a backing-up device adjacent the tool and by which the work-support which is in line with the said tool is supported against the thrust of the tool, and means to retract the said backing-up device from the path of the work-carrier for each advance of the latter.

3. In a machine for finishing the heels of boots or shoes, in combination, the breasting-cutter, means to reciprocate the same, a movable work-carrier having a series of work-supports to receive a plurality of boots or shoes, means to advance the said work-carrier step-by-step to present said boots or shoes successively in position for the heels thereof to be acted upon by the breasting-cutter, and a backing-up device adjacent the breasting-cutter and by which the work-support which is in line with the said breasting-cutter is supported against the thrust of the breasting-cutter.

4. In a machine for finishing the heels of boots or shoes, in combination, the breasting-cutter, means to reciprocate the same, a movable work-carrier having a series of work-supports to receive a plurality of boots or shoes, means to advance the said work-carrier step-by-step to present said boots or shoes successively in position for the heels thereof to be acted upon by the breasting-cutter, a backing-up device adjacent the breasting-cutter and by which the work-support which is in line with the said breasting-cutter is supported against the thrust of the breasting-cutter, and means to retract the said backing-up device from the path of the work-carrier for each advance of the latter.

5. In a machine for finishing boots or shoes, in combination, a reciprocatory tool, a movable work-carrier having a series of work-supports to receive a plurality of boots or shoes, means to advance said work-carrier step-by-step to present said boots or shoes successively in position to be acted upon by the said tool, a backing-up device adjacent the tool and by which the work-support which is in line with the said tool is supported against the thrust of the tool, the said device having operative connection with said advancing means and being operated thereby to retract it from the path of the work-carrier for each advance of the latter.

6. In a machine for finishing the heels of boots or shoes, in combination, the breasting-cutter, means to reciprocate the same, a movable work-carrier having a series of work-supports to receive a plurality of boots or shoes, means to advance the said work-carrier step-by-step to present said boots or shoes successively in position for the heels thereof to be acted upon by the breasting-cutter, a backing-up device adjacent the breasting-cutter and by which the work-support which is in line with the said breasting-cutter is supported against the thrust of the breasting-cutter, the said device having operative connection with said advancing means and being operated thereby to retract it from the path of the work-carrier for each advance of the latter.

7. In a machine for finishing the heels of boots or shoes, in combination, the breasting-cutter, means to reciprocate the same, a movable work-carrier having a series of work-supports to receive a plurality of boots or shoes, step-by-step operating mechanism for said work-carrier having a treadle by means of which the action of said mechanism is controlled manually, and a backing-up device adjacent the breasting-cutter and by which the work-support which is in line with the same is supported against the thrust thereof, the said device having connections with said treadle through which it is retracted for each advance of the work-carrier.

8. In a heel-finishing machine, in combination, a work-support, a breasting-cutter, the slide or plunger by which the said breasting-cutter is operated, means to actuate the said slide or plunger, the stand in which said slide or plunger is mounted, and means to adjust the said stand transversely upon the machine frame to vary the length of heel.

9. In a heel-finishing machine, in combination, a work-support, a breasting-cutter, the slide or plunger by which the said breasting-cutter is operated, means to actuate the said slide or plunger, the stand in which said slide or plunger is mounted, the fixed support having the guideway to which the said stand is applied, and means to adjust the stand within the guideway transversely to vary the length of heel.

10. In a heel-finishing machine, in combination, a work-support, a breasting-cutter, the slide or plunger by which the said breasting-cutter is operated, means to actuate the said slide or plunger, the stand in which said slide or plunger is mounted, the fixed support having the guideway to which the said stand is applied, and the adjusting screw engaging with said stand and serving to adjust the stand within the guide-way transversely to vary the length of heel.

11. In a heel-finishing machine, in combination, the breasting-cutter, a reciprocatory telescoping driver therefor, and a trip controlling the telescoping of said driver and operated by engagement with the work to permit the driver to collapse telescopically after entrance of the breasting-cutter to the required depth into the heel being operated upon.

12. In a heel-finishing machine, in combination, the breasting-cutter, a reciprocatory slide or plunger having one or more projections, a block having one or more projections which coact with that or those of the slide or plunger, and a trip, engaging with the work, and by which the said projections are disengaged and the action in driving the breasting-cutter is terminated when the latter has entered to the required depth into the heel being operated upon.

13. In a heel-finishing machine, in combination, the breasting-cutter, a reciprocatory slide or plunger having one or more projections, a block having one or more projections to coact with that or those of the slide or plunger, a spring by which said block is moved lengthwise relative to the slide or plunger and also is partially rotated to place the projection or projections thereof in line with that or those of the slide or plunger, and a trip operatively connected to partially turn the block or collar to shift the projections out of line with each other and permit the parts to collapse telescopically.

14. In a heel-finishing machine, in combination, the breasting-cutter, its carrier, a reciprocatory slide or plunger having one or more projections, a block having one or more projections to coact with that or those of the slide or plunger, a spring whereby said block and carrier are moved endwise of said slide or plunger and the block is also partially rotated to place the said projection or projections thereof in line with that or those of the slide or plunger, and the tripping gage mounted movably on the said carrier and in operative connection with the said block.

15. In combination, a movable work-carrier, a tool for operating upon a shoe mounted on said work-carrier, a device for backing-up the work-carrier against the pressure of such tool, and means to retract the said backing-up device for the movement of the work-carrier and automatically hold the same retracted until the work-carrier is in proper working position again.

In testimony whereof we affix our signatures each in the presence of two witnesses.

SARAH M. EVANS,
*Administratrix estate of Warren C. Evans.*
EUGENE H. TAYLOR.

Witnesses to the signature of Sarah M. Evans:
   DANIEL GILMAN,
   CHARLES E. BYINGTON.

Witnesses to the signature of Eugene H. Taylor:
   CHAS. F. RANDALL,
   EDITH J. ANDERSON.